July 17, 1962     H. GEISTHOFF     3,044,278

PROTECTION DEVICE FOR SHAFTS

Filed July 5, 1961     2 Sheets-Sheet 1

Inventor
HUBERT GEISTHOFF
By Toulmin & Toulmin
Attorneys

July 17, 1962  H. GEISTHOFF  3,044,278
PROTECTION DEVICE FOR SHAFTS
Filed July 5, 1961  2 Sheets-Sheet 2

Inventor
HUBERT GEISTHOFF
By Toulmin & Toulmin
Attorneys

United States Patent Office 3,044,278
Patented July 17, 1962

3,044,278
PROTECTION DEVICE FOR SHAFTS
Hubert Geisthoff, Lohmar, Rhineland, Germany, assignor to Jean Walterscheid Kommanditgesellschaft, Lohmar, Rhineland, Germany
Filed July 5, 1961, Ser. No. 122,036
Claims priority, application Germany July 4, 1960
5 Claims. (Cl. 64—3)

The present invention relates to a protection device for a universal joint on a drive shaft, more particularly, to a protection device having a pair of protective tubes which are supported on a rotating shaft by an antifriction bearing comprising a resilient ball bearing cage.

Many forms of machinery are equipped with drive shafts provided with universal joints. In agricultural machinery such drive shafts must be protected since they are exposed and present a source of danger to the operator of the machinery. Accordingly, various forms of protection devices have been proposed for both the drive shaft and the universal joint.

One form of protection device comprises at least two tubular members which tubular members are supported on the rotating shaft by means of an antifriction bearing. The disadvantage of such protection devices is that the mounting of the device on the shaft is rather complicated. In addition, such bearing assemblies generally tend to produce a large amount of noise during the operation of the shaft. Further, a problem was presented in properly sealing the ball bearing cage so as to prevent dirt from entering therein and to retain a lubricant in the bearing.

It is therefore the principal object of this invention to provide a novel and improved protection arrangement for universal joints on a rotating shaft.

It is a further object of this invention to provide an inexpensive and a long-lasting bearing assembly for supporting a tubular protecting arrangement on a rotating shaft.

The invention essentially comprises a ball bearing assembly positioned between the protective tube arrangement and the drive shaft. The assembly comprises a bearing cage which is constructed of a resilient non-metallic material. An axial flange projects from the cage so as to be inserted in a clearance between the bearing casing and a portion of the shaft. This flange thus seals the bearing assembly.

The ball bearing cage comprises a plurality of pairs of opposed recesses which are essentially cup-shaped so as to retain the ball bearings therebetween.

The outer race of the ball bearing is retained in place by the bearing casing which is threaded onto a flange mounted on one end of the protective tube enclosing the drive shaft.

The protection device of this invention has many advantages some of which are set forth below. This mounting is a very simple one since the bearing casing together with the bearing cage can be axially slid over the end of the shaft upon which the universal joint is mounted. The mounting is completed by threading the bearing casing onto the protective tube.

The mounting is greatly facilitated by a particular construction of the ball bearing cage wherein an axial flange provides a seal between an edge of the bearing casing and a portion of the shaft. In addition, the protecting arrangement is quieter in operation since the resilient material absorbs much of the running noises. The antifriction bearing is resilient to a high degree and accordingly, in the case of suddenly applied loads, the ball bearings have a certain play in their bearing cage. This feature is of particular importance in protection devices for universal shaft joints in agricultural machinery.

Another advantage is the sealing of the bearing assembly so as to retain the lubricant therein and to prevent dirt from entering.

Other objects and advantages of this invention will be apparent upon reference to the accompanying description when taken in conjunction with the following drawings, wherein FIGURE 1 is an axial sectional view through the end of a drive shaft provided with the bearing mounting of this invention, along the line A—B of FIGURE 3;

A specific embodiment of this invention will next be described with reference to the accompanying drawings wherein like reference symbols indicate the same parts throughout the various views.

Figure 1:
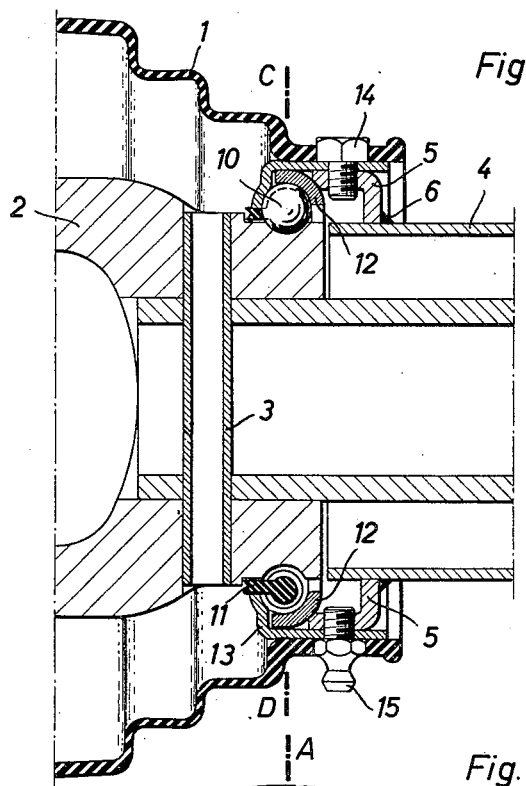
Figure 2:
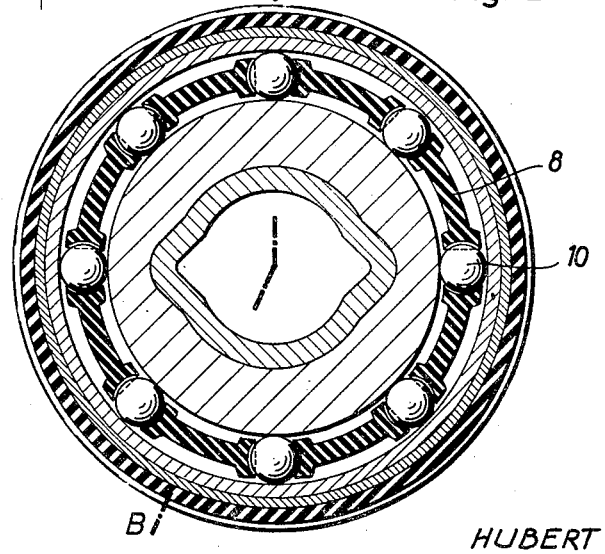
FIGURE 2 is a sectional view, taken along the line C—D of FIGURE 1.
Figure 3:
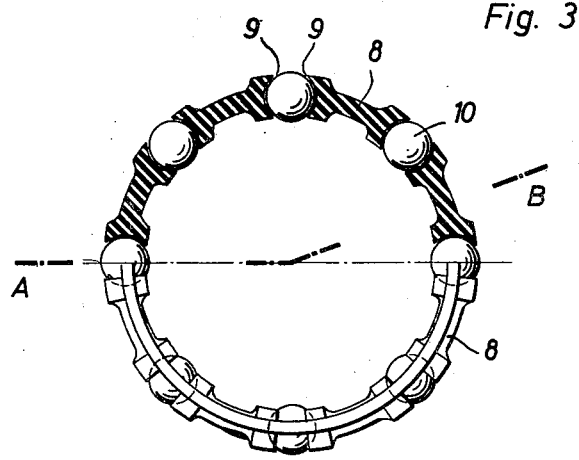
FIGURE 3 is a plan view of the bearing cage of this invention with the upper half of the cage being shown in section.
Figure 4:
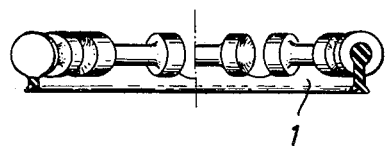
FIGURE 4 is a sectional view, taken along the line A—B of FIGURE 3.

Returning now to FIGURE 1 there is shown a drive shaft 1 which has a fork-type connecting joint 2 attached to the end thereof by transversely extending pin 3. A protective tube 4 encloses the drive shaft 1. The protective tube does not rotate with the shaft. There is an annular member 5 secured to the end of the protecting shaft 4 such as by welding, as indicated at 6. A second protective tube 7 is mounted on the end of the protective tube, preferably on the annular member 5, so as to extend over the end of the drive shaft 1 and to enclose the universal joint of which one component is shown as the fork connection 2.

The ball bearing assembly of this invention is interposed between the drive shaft 1 and the protection devices 4 and 7. The ball bearing assembly comprises a bearing cage 8 which has a plurality of pairs of cup-shaped recesses 9. Ball bearings 10 are retained between each pair of opposed recesses 9.

As may be seen in FIGURE 1 the ball bearing cage 8 comprises an axially extending flange 11. The ball bearing cage is made of a resilient non-metallic material such as a suitable plastic.

The ball bearing assembly further comprises an outer race 12 which is positioned against the outer end of the annular member 5. The assembly is completed by a bearing cap 13 which is screwed onto exterior threads provided on the annular member 5.

The protective tube assembly and the bearing assembly are secured against loosening by a bolt 14.

A lubricating fitting 15 is provided through which a suitable lubricant may be supplied to the bearing assembly.

Since the ball bearings 10 are rotating at only one half of the speed of the universal joint shaft, the sealing flange 11 will also rotate at one half of the sliding speed between the joint 2 and the protective cap 13. As a result, the wear of the axial sealing 11 is quite low.

The ball bearings are embedded in resilient recesses and hence can absorb a considerable amount of impact forces which may be accidently applied to the drive shaft.

In order to disassemble the bearing mounting, the cross-pin 3 is removed and the screw 14 unscrewed from the annular member 5. Accordingly, the cap 13 can be unthreaded from the annular member 5 and axially removed from the shaft 1 together with the connection joint 2. The bearing cage 8 is next off of the shaft 1 and finally the outer race 12 can be similarly removed.

It is pointed out that the simplicity of the various components ensures that one part can be easily replaced and no special tools or specially trained personnel are required for the assembly or disassembly of this mounting.

Thus it can be seen that the present invention provides a protection device which is supported on a drive shaft by a bearing assembly which has a long operating life but which can be simply and readily assembled or disassembled.

It will be understood that this invention is susceptible to modification in order to adapt it to different usages and conditions and, accordingly, it is desired to comprehend such modifications within this invention as may fall within the scope of the appended claims.

What is claimed as this invention is:

1. In a protective arrangement, a drive shaft, a connection on one end of said drive shaft, a protective tube enclosing said drive shaft, a second protective tube extending from said first protective tube over said connection, a ball bearing cage of a resilient non-metallic material between said connection and said second protective tube, said cage having a plurality of recesses and ball bearings being retained in said recesses, and a bearing casing enclosing said bearing cage so that a clearance is formed between said bearing casing and said connection, there being an axial flange on said cage extending into the clearance between said bearing casing and said connection.

2. A protective arrangement for a drive shaft comprising a protective tube enclosing a drive shaft, a second protective tube extending from one end of said first protective tube, a ball bearing assembly between said tubes and the drive shaft, said ball bearing assembly having a bearing cage of a non-metallic resilient material and also having an axial flange extending therefrom, and a casing enclosing said ball bearing assembly so that said flange seals any clearance between said casing and said drive shaft.

3. A protective arrangement for a drive shaft comprising a protective tube enclosing a drive shaft, a second protective tube extending from one end of said first protective tube, a ball bearing assembly between said tubes and the drive shaft, said ball bearing assembly having a bearing cage of a non-metallic resilient material and also having an axial flange extending therefrom, said bearing cage having a plurality of pairs of cup-shaped recesses facing each other so that the ball bearings can be retained therebetween, and a casing enclosing said ball bearing assembly so that said flange seals any clearance between said casing and said drive shaft.

4. A protective arrangement for a drive shaft comprising a protective tube enclosing a drive shaft, an annular ring mounted on one end of said protective tube, a second protective tube extending from said annular ring outwardly of said end of said tube, a ball bearing assembly between said tubes and said shaft, said ball bearing assembly having a bearing cage of a non-metallic resilient material and also having an axial flange extending therefrom, said bearing cage having a plurality of pairs of cup-shaped recesses facing each other so that the ball bearings can be retained therebetween, an outer race for said ball bearing assembly supported against said annular ring, and a casing enclosing said ball bearing assembly so that said flange seals any clearance between said casing and said drive shaft.

5. A protective arrangement for a drive shaft comprising a protective tube enclosing a drive shaft, an annular ring mounted on one end of said protective tube, a second protective tube extending from said annular ring outwardly of said end of said tube, a ball bearing assembly between said tubes and said shaft, said ball bearing assembly having a bearing cage of a non-metallic resilient material and also having an axial flange extending therefrom, an outer race for said ball bearing assembly supported against said annular ring, and a casing enclosing said ball bearing assembly so that said flange seals any clearance between said casing and said drive shaft.

References Cited in the file of this patent

UNITED STATES PATENTS

| 2,919,562 | Weasler | Jan. 5, 1960 |
| 2,952,142 | Schroter et al. | Sept. 13, 1960 |

FOREIGN PATENTS

| 1,104,870 | France | June 22, 1955 |